No. 639,948. Patented Dec. 26, 1899.
A. SUNDH.
JUNCTION BOX OR OTHER COUPLING FOR CASINGS FOR ELECTRIC CABLES OR WIRES.
(Application filed Aug. 12, 1899.)
(No Model.)
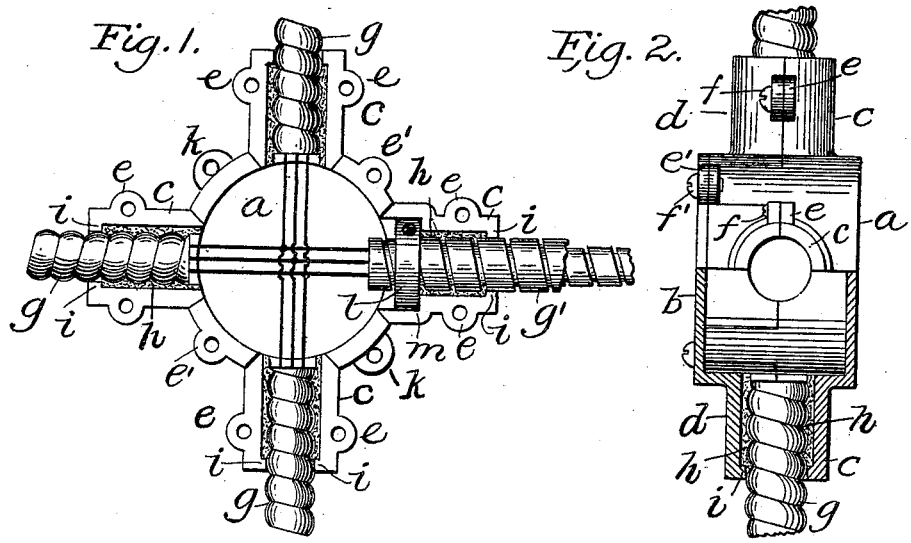
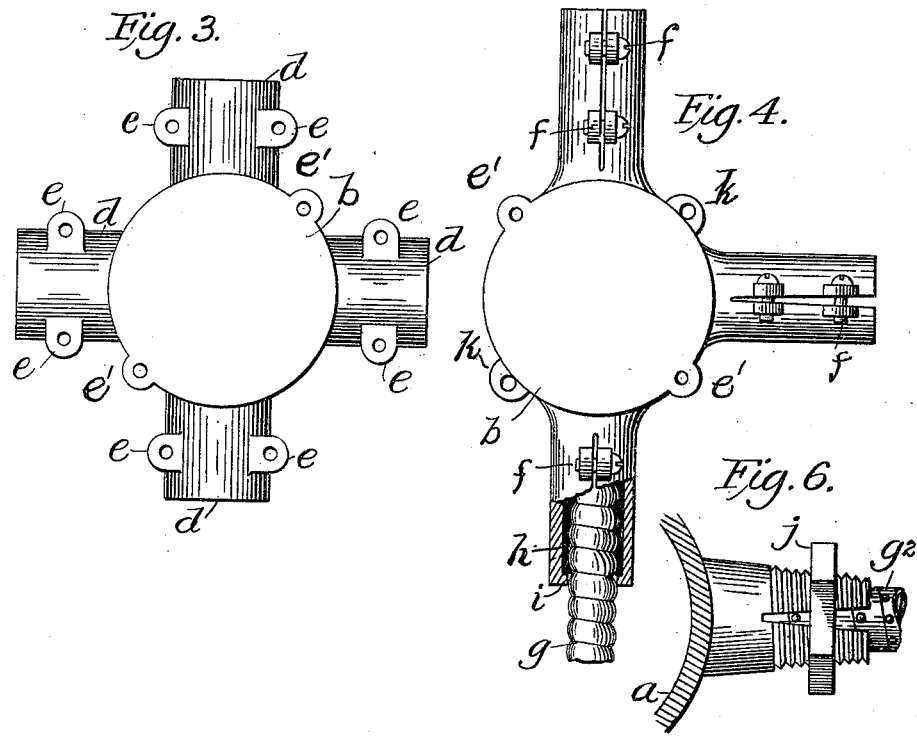
WITNESSES
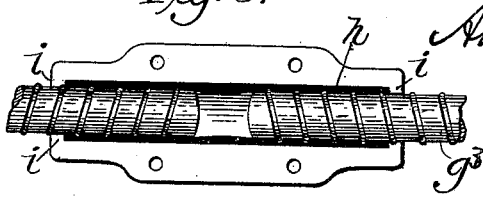
INVENTOR
August Sundh
BY
A. P. Thayer
ATTORNEY

UNITED STATES PATENT OFFICE.

AUGUST SUNDH, OF YONKERS, NEW YORK.

JUNCTION-BOX OR OTHER COUPLING FOR CASINGS FOR ELECTRIC CABLES OR WIRES.

SPECIFICATION forming part of Letters Patent No. 639,948, dated December 26, 1899.

Application filed August 12, 1899. Serial No. 727,012. (No model.)

*To all whom it may concern:*

Be it known that I, AUGUST SUNDH, a citizen of the United States of America, and a resident of Yonkers, county of Westchester, and State of New York, have invented certain new and useful Improvements in Juntion-Boxes or other Couplings for Casings for Electric Cables or Wires, of which the following is a specification.

My invention relates to junction-boxes and other couplings for electric cables or conductors in flexible casings of spirally-wound metallic strips or wires having rough or indented exterior surfaces, said boxes or couplings being made of separable parts or jaws adapted when separated for receiving adjacent end portions of said casings and provided with means for clamping said parts or jaws upon the casings, the object of my invention being to provide simpler and more ready means of securing the end portions of the casings in the clamping parts or jaws of the boxes or couplings. I attain these objects by the mechanism illustrated in the accompanying drawings, in which—

Figure 1 is a plan view of an open junction-box with end portions of flexible casings connected in the sockets in accordance with my invention. Fig. 2 is partly a side elevation and partly a sectional elevation of the box with the cover bolted on. Fig. 3 is a plan of the cover of the box. Fig. 4 is a plan view with a part in section of a junction-box, in which sockets are integral with the body of the box and are split from the outer ends to the body of the box to be sprung tightly on the casings by the clamping-bolts, the casings being inserted endwise. Fig. 5 represents a half part of a coupling for the end portions of two sections of casings with such end portions and the packing in place for being secured by a cover bolted on. Fig. 6 is a side view of an integral taper split and exteriorly-screw-threaded socket in which the casing may be secured in accordance with my invention by a nut screwed on the taper threaded portion.

In an application for Letters Patent for improvements in junction-boxes and other couplings for casings for electric cables or wires filed by me April 1, 1899, Serial No. 711,328, I represented coupling-sockets having recesses in the clamping-surfaces for engaging protuberances of the casings for securing the casings against pulling out, which is effective and satisfactory when the recesses of the clamping-surfaces and the protuberances of the casings correspond; but there are various different constructions of casings with different forms of protuberances requiring as many different forms of recesses in the clamping parts, which is liable to make trouble by serving couplings with recesses differing in form from the form of the protuberances of the casings to be coupled, and there are some forms of casings having grooves or recesses in the surface with which no form of recesses in the clamping-surface will match. It is the purpose of this invention to overcome these difficulties by providing for securing casings having any form of protuberances on or recesses in the surface in clamping-sockets of any kind.

In Figs. 1 and 2, $a$ represents the principal part of the box and hereinafter called the "box," and $b$, Figs. 2 and 3, represents the cover, in which the sockets are formed of one half part $c$, integral with the box, and the other half part $d$, integral with the cover, said parts of the sockets having the lugs $e$, to be clamped together by bolts $f$, and other parts of the box and cover also having lugs, as $e'$, and clamping-bolts $f'$, and the box having lugs $k$ or other devices for fastening it in position.

$g$, $g'$, $g^2$, and $g^3$ represent different forms of flexible casings, composed of spirally-wound strips of metal. Forms $g$ and $g^3$ have protuberant ribs, while form $g^2$ has spurs, and $g'$ is a form in which there is a spiral groove between the edges of the outer plain flat strip coiled on an inner strip. As the protuberances result from the devices employed to lock the spiral coils of the strips against separating under tensile stresses of the casings and vary in form at the will of the different makers, it is desirable to provide means of coupling the casings in the junction-boxes so as to utilize the protuberances to hold effectually against pulling out and such as will be alike applicable to any form of the protuberances or to grooves or creases in the strips. To this end I use the divisional clamping-sockets preferably with plain clamping-surfaces, though they may have protuberances or even recesses, if desired, with a packing tube or sheet *h* of some compressible and resilient material, as asbestos fiber, rubber, or other material, intermediate of the surfaces of the clamping parts of the sockets and the exterior surfaces of the casings, which when the parts are clamped on the casings will be pressed into the creases or around the protuberances and so grip the clamping-surfaces that the casings will be effectually secured. These packing sheets or tubes may have sand or other gritty material upon their surfaces for increasing their frictional hold upon the objects which are to be clamped together.

The sockets may have a retaining-flange *i* for more effectively retaining the packing. The packing may be in tubular form or in sheets rolled up in tubular form. When in complete tubular form, the packings may be inserted in the sockets from the insides of the box, the cover being removed.

The packing made in half parts may be laid in the half parts of the sockets sidewise when the parts of the sockets are separable, as in Figs. 1, 2, and 5.

Instead of making the sockets in separable parts, as in said figures, they may be integrally joined with the box and be split, as in Fig. 4, to be sprung on the casings by the clamping-bolts *f*, or they may be taper and screw threaded, as in Fig. 6, with a nut *j* to effect the clamping. In addition to the packing, a collar *l* may be clamped on the end of a section of casing inside of the box to resist pulling out, and for such collars the boxes have inside sockets *m* larger than the clamping-sockets.

What I claim as my invention is—

1. A flexible metallic casing of spirally-wound strips or wires for electric cables or conducting-wires, said casing having an exterior surface adapted for interlocking with a compressible packing in combination with a junction-box or other connecting-socket adapted to be clamped upon the casings, and having means therefor, and a packing of compressible and resilient material between the clamping-surfaces of the socket and the casing.

2. A flexible metallic casing of spirally-wound strips or wires for electric cables or wires, said casing having an exterior surface adapted for interlocking with a compressible packing, in combination with a junction-box or other collecting-socket adapted to be clamped upon the casings and having retaining-flanges at the mouth of the socket, a packing of compressible and resilient material between the clamping-surfaces of the socket and the casing and means for clamping the socket upon the casing.

3. A flexible metallic casing of spirally-wound strips or wires for armoring electric cables or conducting-wires, said casing having a rough or indented exterior surface, a compressible and resilient packing for said indented exterior surface in combination with a junction-box or other connecting-socket composed of clamping members and means for forcibly confining said clamping members upon said packing.

Signed by me at New York, N. Y., this 10th day of August, 1899.

AUGUST SUNDH.

Witnesses:
A. P. THAYER,
C. SEDGWICK.